United States Patent [19]
Andrus

[11] Patent Number: 5,887,889
[45] Date of Patent: Mar. 30, 1999

[54] STROLLER

[75] Inventor: Michael A. Andrus, Provo, Utah

[73] Assignee: B.O.B. Trailers, Inc., San Luis Obispo, Calif.

[21] Appl. No.: 916,849

[22] Filed: Aug. 22, 1997

[51] Int. Cl.$^6$ .................................................. B62B 7/08
[52] U.S. Cl. ..................................... 280/647; 280/642
[58] Field of Search ................................ 280/647, 650, 280/655, 655.1, 641, 639, 47.38, 47.371, 62, 704, 124.1

[56] References Cited

U.S. PATENT DOCUMENTS

| 4,527,665 | 7/1985 | Shamie | 280/650 |
| 5,257,799 | 11/1993 | Cone et al. | 280/647 |
| 5,346,119 | 11/1994 | Leu | 280/647 |

*Primary Examiner*—Robert J. Oberleitner
*Assistant Examiner*—Clovia Hamilton
*Attorney, Agent, or Firm*—Daniel C. McKown

[57] ABSTRACT

The stroller includes a frame inclined downward and forward, the frame having left and right side frame members joined by a handle at their upper rear ends. A single front wheel is mounted on an axle at the lower front end of the frame. Left and right swing arms extend downward and rearward from pivotal attachments on the left and right side frame members, respectively. Left and right rear wheels are mounted on axles at the lower ends of the swing arms. There is no rigid connection or horizontal member between the front and rear axles, thereby permitting the stroller to clear higher curbs or carry cargo that extends into the space between the front and rear axles, while also reducing the weight of the stroller. On each side of the stroller a resilient member is detachably connected between the swing arm and a point on the side frame member above and to the rear of the point at which the swing arm is attached. The resilient members yieldingly oppose pivotal motion of the swing arm in both rotational senses from an equilibrium position. Disconnection of the resilient members permits the swing arms to be pivoted forward for storage or transportation with the rear wheels much closer to the front wheel.

9 Claims, 3 Drawing Sheets ly.
STROLLER

BACKGROUND OF THE INVENTION

1. Field of the Invention

The present invention is in the field of baby strollers, and particularly relates to a three-wheeled baby stroller that can be folded to a more compact configuration for storage or transportation. The suspension system and the structure of the frame are believed to be novel.

2. The Prior Art

A search of the patent literature revealed that a number of inventors have designed collapsible baby strollers, and some of the most noteworthy designs will now be briefly discussed.

In U.S. Pat. No. 5,536,033 issued Jul. 16, 1996 to Hinkston, there is described a three-wheeled jogging stroller with demountable wheels. The center of gravity of the cargo is located approximately vertically above the rear axle and is supported above the axle by vertically-extending struts. The front and rear axles are connected by rigid frame members.

In U.S. Pat. No. 5,364,119 issued Nov. 15, 1994, Leu describes a stroller that differs from that of Hinkston notably in the addition of a compression spring in each of the vertically-extending struts.

In U.S. Pat. No. 5,299,825 issued Apr. 5, 1994 to Smith there is described a collapsible stroller in which rear stub axles are eccentrically mounted to the frame, and a spring that extends into the space between the front and rear wheels opposes eccentric motion of the rear axles. A similar suspension system is shown in British Patent No. 592,772 issued Sep. 29, 1947 to Hudlass.

In U.S. Pat. No. 5,188,389 issued Feb. 23, 1993, Baechler et al. describe a foldable baby stroller in which the front and rear axles are connected by rigid structural members and in which upright support tubes are pivotally connected to the upper frame. There are no resilient members in the suspension system. This stroller is substantially similar to that shown in U.S. Pat. No. Des. 370,194 issued May 28, 1996 to Baechler et al.

In U.S. Pat. No. 3,653,681 issued Apr. 4, 1972 to Virtue there is shown a baby stroller in which the wheels are mounted at the lower ends of pivoted inclined cross-arms and the upper ends of the cross-arms are connected by a horizontal resilient element.

In U.S. Pat. No. 3,012,796 issued Dec. 12, 1961, Mieding shows a bicycle trailer having two front wheels and one rear wheel. The front axle is mounted on the lower ends of swing arms that are pivotally mounted to the sides of the trailer. Horizontal springs extend rearwardly from the front axle through the space between the front and rear wheels to brackets that are affixed to the bottom of the trailer.

In U.S. Pat. No. 2,492,676, Zajicek shows a collapsible hamper cart in which a spring connects the front and rear axles.

As will be described more fully below, the stroller of the present invention differs significantly from the strollers of the above patents in its suspension system, its structure, and its manner of folding up.

BRIEF SUMMARY OF THE INVENTION

One objective of the present invention is to provide a three-wheeled foldable stroller having a suspension system that is both simple and highly effective.

A second objective of the present invention is to provide a stroller in which no structural members intrude into the space between the front and rear wheels, thereby permitting the stroller to clear higher curbs or to carry cargo that extends into the space between the front and rear axles.

A third objective of the present invention is to provide a stroller that is light in weight. This is achieved in accordance with the present invention by omitting the usual members that connect the front and rear axles.

A fourth objective of the present invention is to provide a stroller that can be readily folded to a more compact configuration for ease of transportation and storage. In accordance with the present invention, folding is accomplished by disconnecting the resilient members that keep the rear wheel swing arms in their equilibrium positions, and then pivoting the swing arms forward to bring the rear wheels much closer to the front wheel.

In accordance with the present invention, the stroller includes a frame inclined downward and forward, the frame having left and right side frame members. A handle joins the left and right side frame members at their upper rear ends. A single front wheel is mounted on an axle at the lower front end of the frame. Left and right swing arms extend downward and rearward from pivotal attachments on the left and right side frame members, respectively. Left and right rear wheels are mounted on axles at the lower ends of the swing arms.

In a first preferred embodiment, the swing arms are connected by a lateral brace so that they swing in unison with respect to the frame. In a second preferred embodiment, the lateral brace is omitted, and the swing arms are free to move independently of one another.

The novel features which are believed to be characteristic of the invention, both as to structure and method of operation, together with further objects and advantages thereof, will be better understood from the following description considered in connection with the accompanying drawings in which two preferred embodiments of the invention are illustrated by way of example. It is to be expressly understood, however, that the drawings are for the purpose of illustration and description only and are not intended as a definition of the limits of the invention.

DETAILED DESCRIPTION OF THE INVENTION

Figure 1:
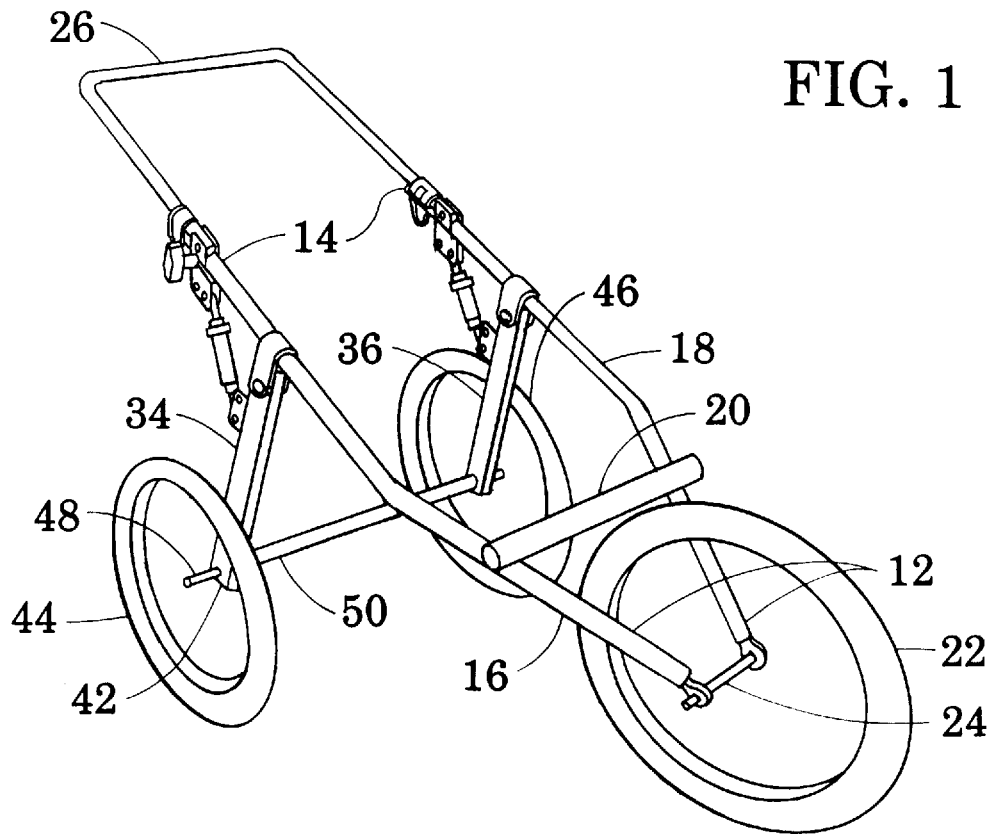
FIG. 1 is a front right top perspective view of the frame of the stroller in a first preferred embodiment.

FIG. 1 shows the stroller frame in accordance with a first preferred embodiment. The frame is symmetrical in that the left and right sides are mirror images of one another. Accordingly, in the following description, where only one side is discussed, it may safely be assumed that the discussion applies to the other side as well. The frame is noteworthy for the absence of rigid structural members directly joining the front and rear axles, which is made possible by the particular suspension system used for the rear wheels.

The frame includes a front end portion 12 on which is mounted a front axle 24 and further includes a rear end portion 14 to which a handle 26 is attached. The frame includes a right side frame member 16 and a left side frame member 18; these are connected by a lateral frame member 20. A single front wheel 22 is mounted on the front axle 24; the latter is removably affixed to the frame by a quick-release device.

Figure 3:
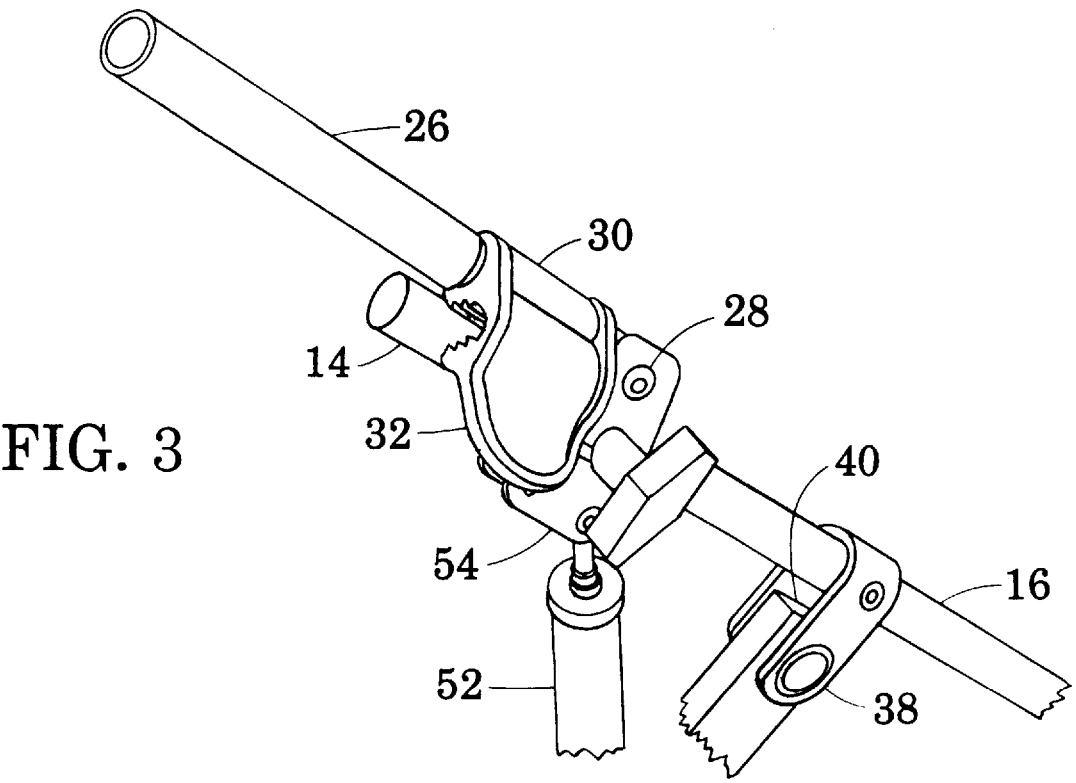
FIG. 3 is a fractional side perspective view showing how several parts are connected to the frame in the preferred embodiment of FIG. 1.

The handle 26 is pivotally connected to the rear end portions 14 of the frame by the pivots 28. When the stroller is in motion it is not desirable for the handle to pivot with respect to the frame; the handle is pivoted upwardly and forwardly only when the stroller is to be stored. Therefore, a clip 30 is provided for preventing the handle from pivoting forward when the stroller is in use. The clip 30 maintains the front end of the handle 26 parallel with the rear end portion 14 of the frame. When the stroller is to be stored, the user pulls the tab 32 laterally outward and upward, thereby releasing its grip on the rear end portion of the frame 14 as shown in FIG. 3. Releasing the clip 30 in this manner permits the handle 26 to pivot upward and forward about the pivot 28 for storage and shipping.

Figure 2:
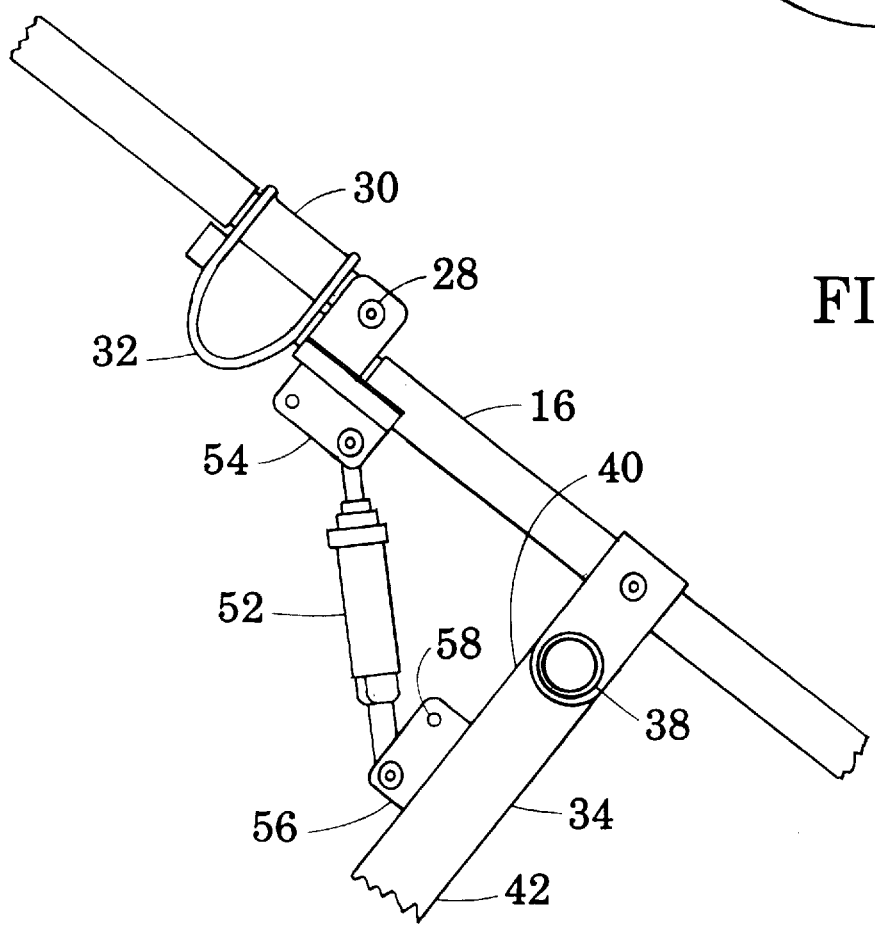
FIG. 2 is a fractional side perspective view showing the suspension system used in the embodiment of FIG. 1.

As best seen in FIG. 2, a swing arm 34 includes an upper end portion 40 and a lower end portion 42. The upper end portion 40 is pivotally connected to the right side frame member 16 by the bearing block 38. In the first preferred embodiment, the lower end portions of the right and left swing arms are connected by a lateral swing arm brace 50 that constrains the swing arms to pivot in unison.

A right rear stub axle 48 extends laterally outward from the lower end portion of the right swing arm 34, and a right rear wheel 44 is mounted on the right rear stub axle.

Similarly a left rear wheel 46 is mounted on a left swing arm 36.

The upper end of a resilient member 52 is pivotally connected to the right side frame member 16 by the bracket 54 at a location between the rear end portion 14 of the frame and the location at which the upper end portion 40 of the right swing arm 34 is pivotally attached to the frame.

The lower end of the resilient member 52 is pivotally and detachably connected to the right swing arm 34 by a pin that extends through the bracket 56. A second hole 58 in the bracket 56 allows adjustment to permit the stroller to accommodate loads of different weights. An identical resilient member is similarly mounted on the left side of the stroller.

In an alternative embodiment, the removable pin extends through the bracket 54 instead of through the bracket 56, and the upper end of the resilient member is thereby detachably connected to the frame.

In the preferred embodiments, the resilient member 52 yieldingly opposes pivotal motion of the swing arm 34 in both rotational directions from an equilibrium position that obtains when the resilient member is unloaded. In addition to its resiliency, the resilient member supplies some damping in the preferred embodiment.

Figure 4:
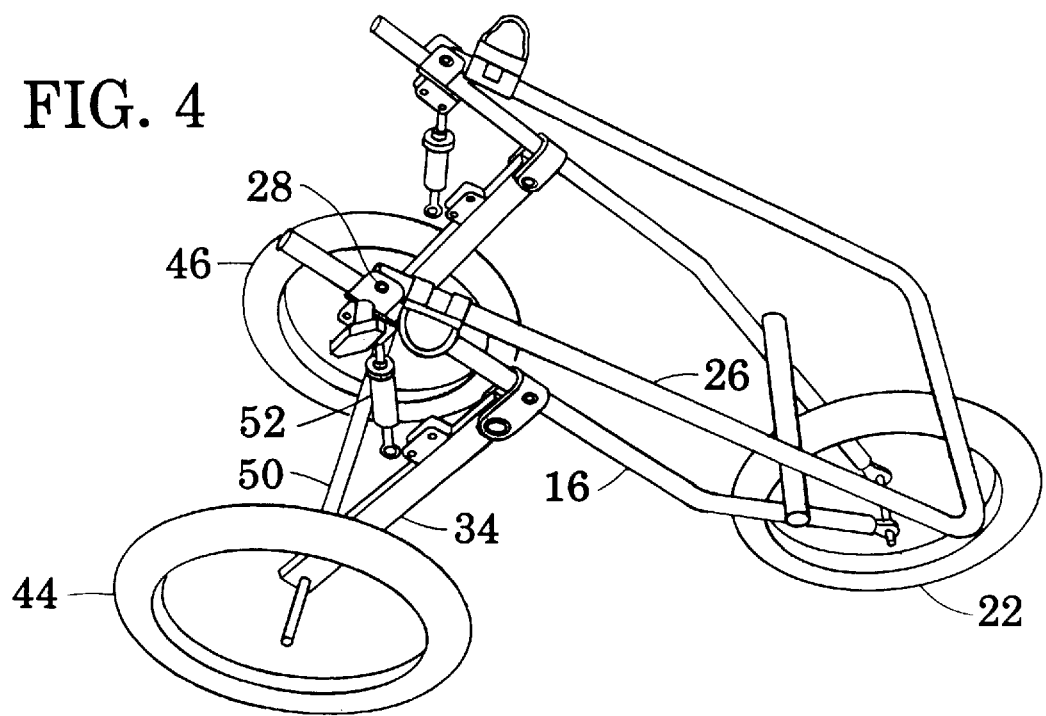
FIG. 4 is a top right side perspective view showing the handle folded forward in the embodiment of FIG. 1.
Figure 5:
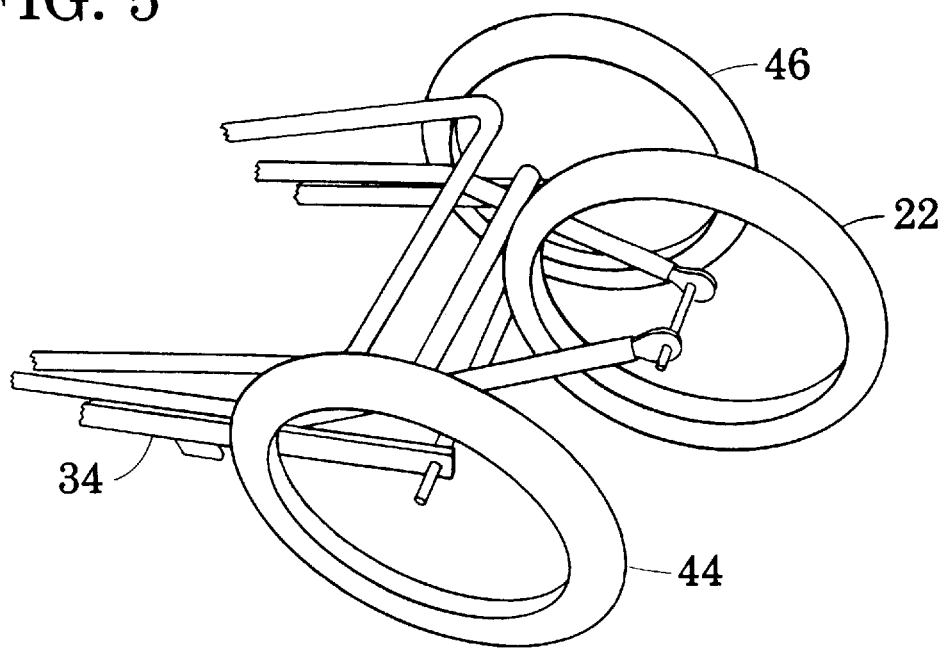
FIG. 5 is a perspective view showing both the handle and the swing arms folded forward in the first preferred embodiment of FIG. 1; and, FIG. 6 is a front right top perspective view of the frame of the stroller in a second preferred embodiment.

As indicated in FIG. 4, when the stroller is to be folded for storage or shipping, the handle is pivoted forward so that it lies adjacent the frame and the lower ends of the resilient members are disconnected from their brackets by removing the pins. This frees the swing arms for pivoting motion, and they are then brought forward to the position shown in FIG. 5, at which the rear wheels 44 and 46 are much closer than originally to the front wheel 22. An even smaller configuration may be obtained by removing the wheels from the frame.

Figure 6:
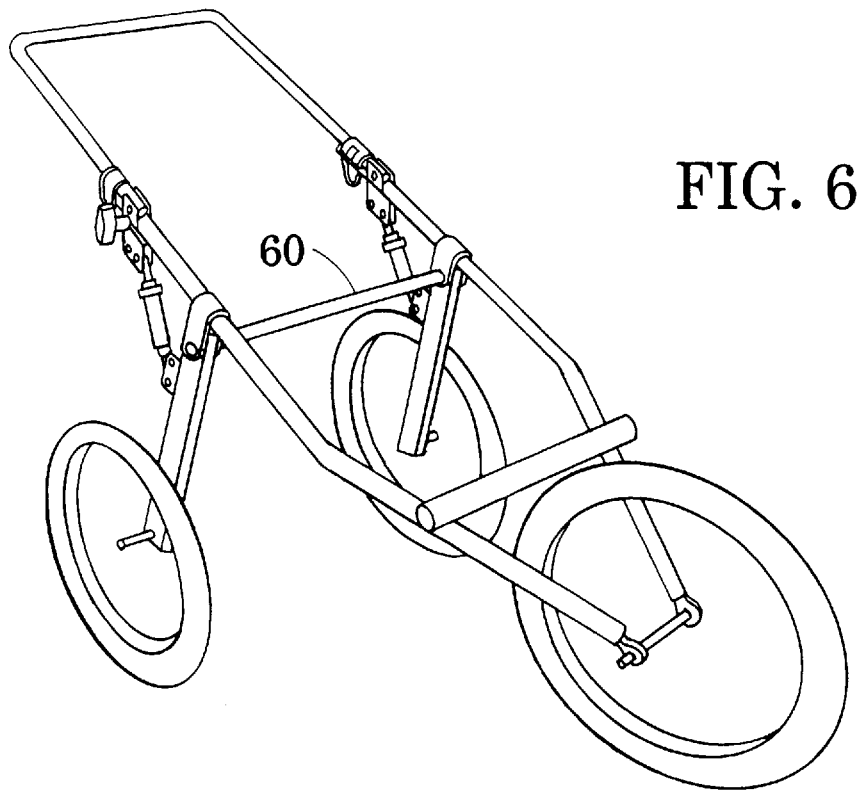

FIG. 6 shows a second preferred embodiment in which the lateral swing arm brace 50 of FIG. 1 is omitted, permitting the left and right swing arms to pivot independently. An optional lateral frame brace 60 may be added in this embodiment to provide greater rigidity.

Thus, there has been described a stroller in which the rear wheels are mounted on stub axles that extend outwardly from swing arms that are pivotally attached to the frame. Pivotal motion of the swing arms is restrained by connecting a resilient member between each swing arm and the frame. Each resilient member yieldingly opposes pivotal motion of its swing arm in both rotational directions from an equilibrium position. This manner of using the resilient member not only provides a softer ride, but also it eliminates the rigid longitudinal structural members that usually connect the front and rear axles in strollers. The elimination of such structural members results in lighter weight and the ability to negotiate higher curbs. It also permits the stroller to carry loads that extend into the space between the front and rear axles. When the stroller of the present invention is to be folded for storage or shipping, the resilient member on each side can be disconnected, thereby permitting the swing arms to be brought forward to a position that is much closer to the front wheel.

The foregoing detailed description is illustrative of two preferred embodiments of the invention, and it is to be understood that additional embodiments thereof will be obvious to those skilled in the art. The embodiments described herein together with those additional embodiments are considered to be within the scope of the invention.

What is claimed is:

1. A stroller comprising:
   a frame including a front end portion and a rear end portion;
   a swing arm including a lower end portion and an upper end portion, the upper end portion of said swing arm pivotally attached to said frame at a location intermediate the rear end portion of said frame and the front end portion of said frame; and,
   resilient means connected to said frame at a location rearward of the location at which the upper end portion of said swing arm is pivotally attached to said frame, and connected to said swing arm at a location below its upper end portion, said resilient means yieldingly opposing movement of said swing arm in either rotational direction from an equilibrium position.

2. The stroller of claim 1 wherein said resilient means is detachably connected to said swing arm.

3. The stroller of claim 1 wherein said resilient means is detachably connected to said frame.

4. A stroller comprising:
   a frame including a front end portion and a rear end portion;
   a handle attached to the rear end portion of said frame;
   a swing arm including a lower end portion and an upper end portion, the upper end portion of said swing arm pivotally attached to said frame at a location intermediate the rear end portion of said frame and the front end portion of said frame; and, resilient means connected to said frame at a location rearward of the location at which the upper end portion of said swing arm is pivotally attached to said frame, and connected to said swing arm at a location below its upper end portion, said resilient means yieldingly opposing movement of said swing arm in either rotational direction from an equilibrium position.

5. The stroller of claim 4 wherein said resilient means is detachably connected to said swing arm.

6. The stroller of claim 4 wherein said resilient means is detachably connected to said frame.

7. A stroller comprising:

a frame including a front end portion and a rear end portion;

a front wheel rotatably mounted to the front end portion of said frame;

a handle attached to the rear end portion of said frame;

a swing arm including a lower end portion and an upper end portion, the upper end portion of said swing arm pivotally attached to said frame at a location intermediate the rear end portion of said frame and the front end portion of said frame;

a rear wheel rotatably mounted to the lower end portion of said swing arm; and;

resilient means connected to said frame at a location rearward of the location at which the upper end portion of said swing arm is pivotally attached to said frame, and connected to said swing arm at a location below its upper end portion, said resilient means yieldingly opposing movement of said swing arm in either rotational direction from an equilibrium position.

8. The stroller of claim 7 wherein said resilient means is detachably connected to said swing arm, so that when said resilient means is detached from said swing arm, said swing arm may be pivoted forward without opposition to bring said rear wheel much closer to said front wheel.

9. The stroller of claim 7 wherein said resilient means is detachably connected to said frame, so that when said resilient means is detached from said frame, said swing arm may be pivoted forward without opposition to bring said rear wheel much closer to said front wheel.

* * * * *